(12) United States Patent
Browne et al.

(10) Patent No.: US 7,900,755 B2
(45) Date of Patent: Mar. 8, 2011

(54) BI-FOLD VALVE-TYPE MAGNETORHEOLOGICAL FLUID ENERGY ABSORBING DEVICE

(75) Inventors: Alan L. Browne, Grosse Pointe, MI (US); John C. Ulicny, Oxford, MI (US); Chandra S. Namuduri, Troy, MI (US); Nancy L. Johnson, Northville, MI (US); Norman M. Wereley, Potomac, MD (US); Young Tai Choi, Laurel, MD (US); Wei Hu, Rockville, MD (US); Min Mao, College Park, MD (US)

(73) Assignee: GM Global Technology Operations LLC, Detroit, MI (US)

( * ) Notice: Subject to any disclaimer, the term of this patent is extended or adjusted under 35 U.S.C. 154(b) by 627 days.

(21) Appl. No.: 11/864,107

(22) Filed: Sep. 28, 2007

(65) Prior Publication Data

US 2009/0084646 A1  Apr. 2, 2009

(51) Int. Cl.
*F16F 9/53* (2006.01)

(52) U.S. Cl. .................................................. 188/267.2

(58) Field of Classification Search .................. 188/266, 188/267–267.2
See application file for complete search history.

(56) References Cited

U.S. PATENT DOCUMENTS

| | | | | |
|---|---|---|---|---|
| 4,575,030 A | * | 3/1986 | Gratzer | 244/209 |
| 4,660,688 A | * | 4/1987 | Spisak et al. | 188/266.2 |
| 4,934,667 A | * | 6/1990 | Pees et al. | 267/64.21 |
| 5,354,488 A | * | 10/1994 | Shtarkman et al. | 252/62.56 |
| 5,570,763 A | * | 11/1996 | Parejo | 188/282.8 |
| 6,007,345 A | * | 12/1999 | Francis et al. | 439/34 |
| 6,131,709 A | * | 10/2000 | Jolly et al. | 188/267.2 |
| 6,241,391 B1 | * | 6/2001 | Hoose | 384/49 |
| 6,279,701 B1 | | 8/2001 | Namuduri et al. | |
| 6,311,810 B1 | * | 11/2001 | Hopkins et al. | 188/267.2 |
| 6,336,535 B1 | * | 1/2002 | Lisenker | 188/267.2 |
| 6,390,252 B1 | | 5/2002 | Namuduri et al. | |
| 6,641,166 B2 | | 11/2003 | Browne et al. | |
| 6,691,840 B1 | * | 2/2004 | Lisenker et al. | 188/267.1 |
| 6,694,856 B1 | | 2/2004 | Chen et al. | |
| 6,983,832 B2 | | 1/2006 | Namuduri et al. | |
| 7,051,849 B2 | | 5/2006 | Browne et al. | |
| 2004/0118646 A1 | * | 6/2004 | Lun | 188/267 |

FOREIGN PATENT DOCUMENTS

| | | |
|---|---|---|
| JP | 2005096587 A | 4/2005 |
| JP | 2006292096 A | 10/2006 |
| KR | 1020070066316 A | 6/2007 |
| WO | WO2007012283 A1 | 2/2007 |

* cited by examiner

*Primary Examiner* — Christopher P Schwartz
(74) *Attorney, Agent, or Firm* — Quinn Law Group, PLLC

(57) ABSTRACT

An energy absorbing device is provided that includes a damper assembly having inner and outer concentric tubes and a piston movable within the inner tube. The damper assembly is configured to form bi-fold valve-type cavities to operatively connect an inner chamber of the inner tube with an outer chamber formed between the inner and outer tubes. A magnetorheological fluid fills the chambers and the bi-fold valve-type cavities. The magnetorheological fluid preferably contains coated magnetic particles at about 10 to 60 percent by volume. Electrical coils adjacent the bi-fold valves are selectively energizable to such that the energy absorbing device provides a tunable damping force, preferably over the entire range of velocities of the piston, especially in automotive applications.

12 Claims, 4 Drawing Sheets

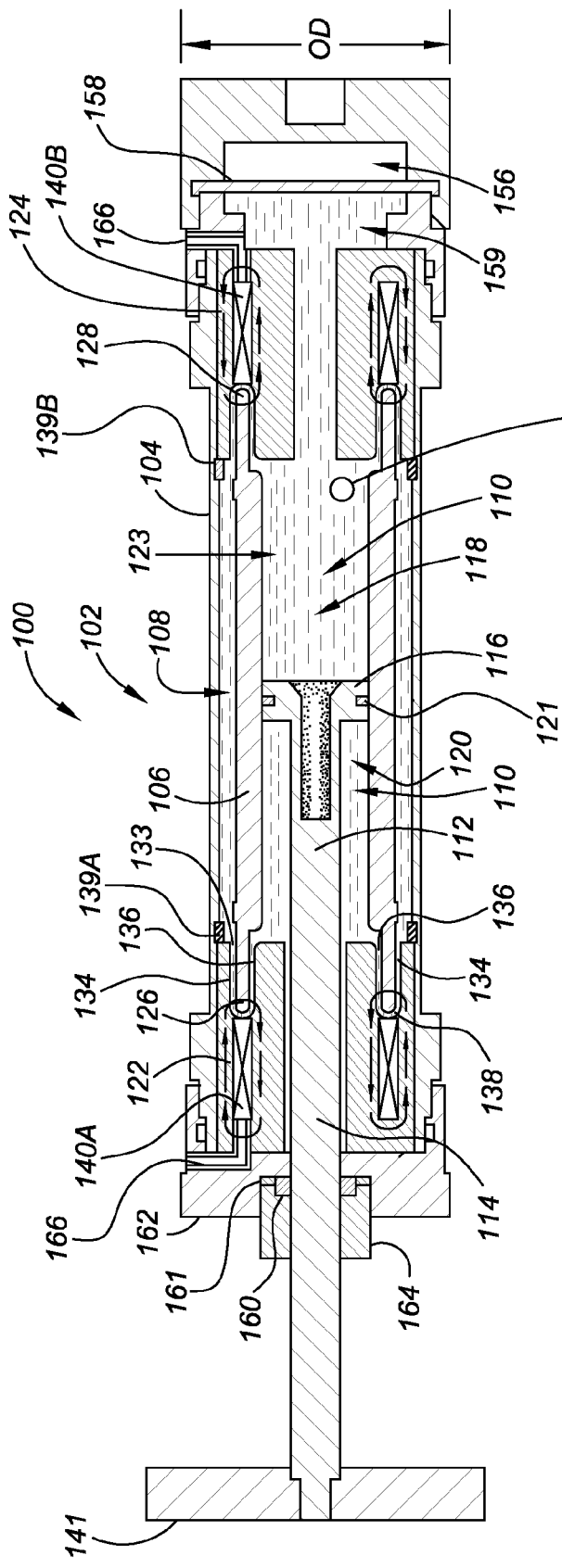
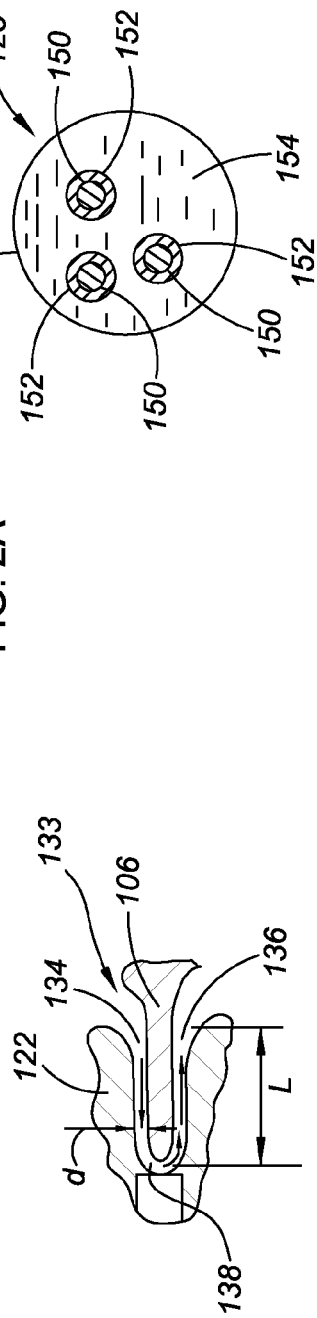
FIG. 2C
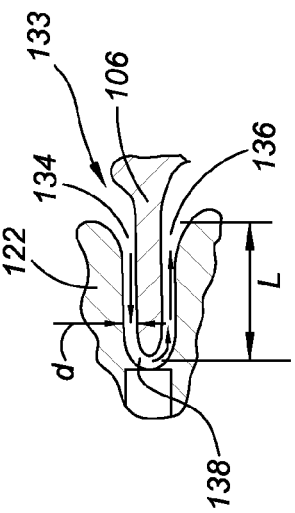
FIG. 2B
FIG. 2A

BI-FOLD VALVE-TYPE MAGNETORHEOLOGICAL FLUID ENERGY ABSORBING DEVICE

TECHNICAL FIELD

The invention relates to a bi-fold valve-type magnetorheological fluid energy absorbing device of a compact design configured to provide a desired turn-up ratio over a full range of stroking velocity conditions.

BACKGROUND OF THE INVENTION

Magnetorheological (MR) fluids belong to a class of controllable fluids. The essential characteristic of these fluids is their ability to change from a free-flowing, linear, viscous liquid to a semi-solid with controllable yield strength in milliseconds when exposed to a magnetic field. In the absence of an applied field, MR fluids are reasonably well approximated as Newtonian fluids.

Magnetorheological energy absorption (MREA) devices harness the ability of MR fluids to change yield strength with a change in applied field. MREA devices are referred to as "tunable", meaning that the resultant yield strength, and therefore energy absorption capability, can be varied by controlling the applied magnetic field. MREA devices have been identified as candidates for tunable impact energy absorption applications, meaning those in which a high shock load is applied during a short time period. Heretofore, MREA devices have been less than ideal for many automotive applications related to impact energy management and control of deceleration because of their large size and the lack of significant field controlled tunability of their stroking force (i.e., damping force) over the required range of stroking velocities. Tunability of damping force is critical to the desirability and usefulness of MREA devices in many applications, such as automotive applications where control of deceleration is important. For example, a damping force suitable for absorbing energy in one impact event may be too large for another, in which case tunability of the MREA device to respond with a lower damping force, and therefore a lower deceleration, is desirable.

SUMMARY OF THE INVENTION

An MREA device having a flow-mode, bi-fold design is provided that is compact enough for a variety of applications, including certain automotive applications, and that exhibits tunability over the force levels and at the velocities required for effective impact energy management in certain applications, such as automobiles, helicopters, trains, and other transportation vehicle applications. In certain applications, the tunability is preferably a two to one ratio, but this is not required for all applications. For example, the MREA device may be utilized in certain automotive applications including, but not limited to, a knee bolster, a steering wheel assembly, a seat belt load limiter, child seat tethers, sliding seats, crash or crush boxes (i.e., dedicated energy absorption devices between a bumper and a vehicle frame) and bumper systems. The desired range of tunability and expected piston velocities may be a function of the expected vehicle velocity range (e.g., 10 miles per hour to 30 miles per hour), the vehicle mass when fully loaded versus that when unloaded (e.g., carrying only one occupant), or a ratio of maximum to minimum occupant mass. Preferably, some degree of tunability is desired at piston speeds of up to at least 35 miles per hour (approximately 16 meters per second).

Specifically, an MREA device is provided that includes a damper assembly having an inner tube and an outer tube generally surrounding and preferably concentric with the inner tube. The inner tube defines an inner chamber. The outer tube partially defines an outer chamber between the inner and outer tubes. A piston is moveable within the inner tube and divides the inner chamber. The damper assembly is configured to form bi-fold valves (also referred to herein as bi-fold valve-type cavities) to operatively connect the inner chamber with the outer chamber. This is accomplished preferably by magnetic end structure assemblies positioned at opposing ends of the inner tube each of which, at least partially, defines a cavity with openings at both the inner and the outer chamber and a looped portion therebetween that establishes a flow-reversing path between the cavity openings. Such a cavity may be referred to as a bi-fold valve-type cavity. The energy absorbing device includes an MR fluid that is within the inner and outer chambers and the cavities. The MR fluid preferably contains 10-60 percent by volume magnetic particles, and preferably greater than 20 percent by volume magnetic particles. Preferably, the particles are coated, such as with a silicate coating, that causes the viscosity and the off-state yield stress of the MR fluid to decrease. Electrical coils are fixed adjacent to the magnetic end structure assemblies, preferably concentric with the inner and outer tubes and are energizable to create a magnetic field that acts on the MR fluid to vary the damping force of the damper assembly. Preferably, the cavity is formed with smooth, continuous surfaces, i.e., surfaces without discontinuity in slope or curvature at adjacent portions, such as without edges, in order to enhance laminar (rather than turbulent) flow of the MR fluid through the cavities as the piston moves, which maximizes the tunable increase in yield stress of the MR fluid as it passes through the cavity for the achievable range of flux densities. The damper assembly, the MR fluid and the electrical coils are configured to provide a desired tunability of damper force over the full range of piston velocities specified or that may be encountered in a particular application. For example, for certain applications, this may be preferably, but not necessarily, at ratio of approximately two to one of the damper force when the coils are energized to flux saturation versus the damper force when the coils are not energized (zero field) (i.e., "tunability") as the piston moves (in response to an impact), preferably but not necessarily over the entire piston velocity range specified for or that may be encountered in the particular application. Thus, the deceleration of the energy absorbing device and objects operatively connected thereto is also controlled via the tunability. For example, in one particular application, the two to one tunability ratio may be achieved over a range of piston speeds of up to about 7 meters per second, with a zero field damper force not greater than 2 kilonewtons, and where the outer diameter of the MREA device is not greater than 5 centimeters.

In order to prevent cavitation in the MR fluid when the piston moves at high speeds, and in order to compensate for the change in volume within the inner chamber due to the changing length of piston rod that is within the inner chamber as the piston moves, a compressible member may be placed around the piston rod adjacent the piston head. As the piston moves, the compressible member compresses or decompresses (i.e., varies in volume) in response to the pressure of the MR fluid in contact with the compressible member. The compressible member may be a closed cell foam material or, alternatively, a tube-like gas chamber separated from the MR fluid by a flexible diaphragm, or alternatively a tube-like gas chamber separated from the MR fluid by a floating piston around the circumference of which is a piston ring or gasket that prevents communication of the MR fluid and gas. As an alternative to a compressible member placed around the piston rod, a pneumatic chamber may be operatively connected to the MR fluid, either at an end of the MREA device or at an intermediate location, between the coils.

The MREA device may include an improved electrical connector that minimizes leakage of the MR fluid, and especially the magnetic particles therein, thereby enabling the expected yield stress and damping force capabilities to be maintained. Specifically, an electrical connector may be provided that includes a socket defining a cavity, with multiple layers of rubber disks surrounding a plastic disk within the socket. A plug encloses the rubber disks and the plastic disk within the socket. The socket, the plug, and the plastic layer all have aligned holes that are preferable preformed in which wires may be directed from the electrical coils out of the MREA. Preferably, the rubber layers do not have any such holes preformed therein, and the wires must "punch" through the rubber layers when extending through the electrical connector. The socket and plug may be threaded so that the plug can be turned with sufficient pressure to tightly compress the rubber and plastic layers to prevent leakage of the MR fluid past the coils through the electrical connector.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2A is a schematic illustration in cross-sectional view of a first embodiment of a magnetorheological energy absorbing device within the scope of the invention;

FIG. 2B is a schematic illustration in schematic cross-sectional fragmentary view of a bi-fold valve-type or fluid channel or cavity formed by the magnetorheological energy absorbing device of FIG. 2A;

FIG. 2C is a schematic illustration in schematic cross-sectional fragmentary view of the magnetorheological fluid, including coated magnetic particles, used in the magnetorheological energy absorbing device of FIG. 2A;

DESCRIPTION OF THE PREFERRED EMBODIMENTS

Figure 1:
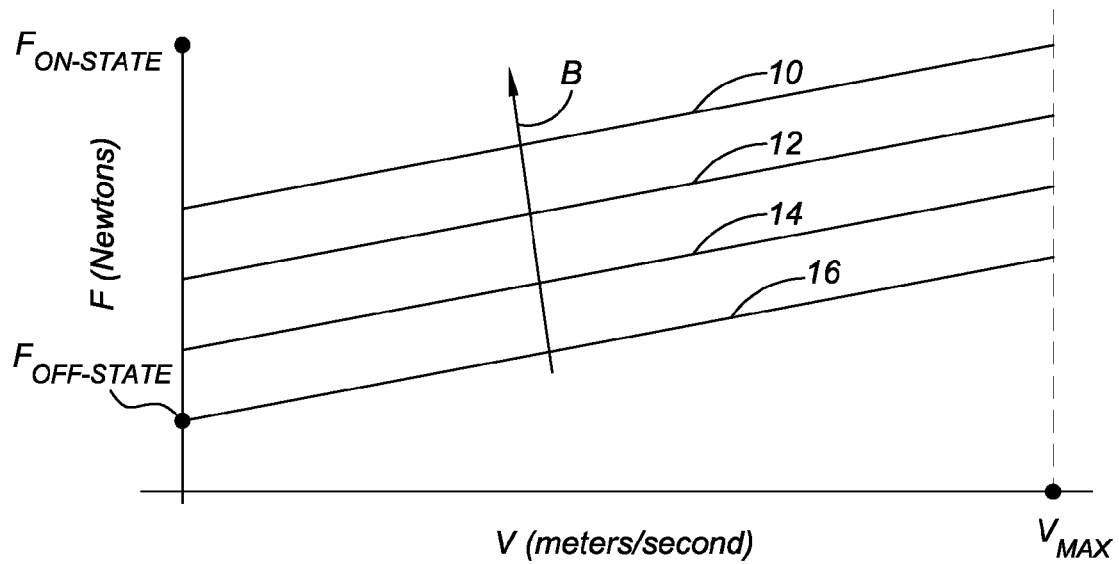
FIG. 1 is a graph of damper force (Newtons) versus damper piston velocity (meters per second) for a magnetorheological energy absorbing device at various magnetic flux densities.

Referring to the drawings, wherein like reference numbers refer to like components, FIG. 1 illustrates the effect of increasing flux density (direction of arrow B) of a magnetic field applied to a magnetorheological fluid energy absorber (MREA) on the damping force of the MREA. The increase in damping force (or shear force) at any given velocity (or shear rate) is due to the increase in yield stress of an MR fluid when subjected to a magnetic field perpendicular to the direction of flow of the fluid. For a given flux density (which corresponds with a given level of electrical current to electrical coils in the MREA), the damping force (F) increases linearly with the piston speed of the damper at a rate proportional to the viscosity of the carrier fluid. The piston speed or velocity (V) of the damper is a function of the speed of an impacting force acting on the damper. FIG. 1 also illustrates that the slope of damper force versus piston speed of the damper remains relatively constant at different flux densities. It should be appreciated that the behavior of the damper force at low piston velocities, i.e., in the pre-yield range, is nonlinear; however, at higher piston velocities, i.e., in the post-yield range, the ratio of force to velocity is approximately linear, being just the viscosity of the carrier fluid. Line 10 represents the shear force as a function of shear rate for the maximum achievable flux density specific to the design of the of the damper, referred to herein as "on-state" and resulting in $F_{ON-STATE}$ when the piston is at zero velocity; line 16 represents the performance of the damper under zero applied field (i.e., no current supplied to the electrical coils), referred to herein as "off-state" and resulting in $F_{OFF-STATE}$ when the piston is at zero velocity, with lines 12 and 14 representing various levels of flux density therebetween. The damper force is "tunable" between that achieved at the maximum flux density state and that achieved at the zero flux density state by varying the applied current (or voltage), with the ratio of the zero field damper force to the damper force achieved at flux saturation being referred to as the turn-up ratio, tunability or dynamic range. It is apparent from FIG. 1 that, in order to achieve a selected ratio of tunability of the damper at increasing damper piston speeds, the slope of the damper force versus damper piston velocity (i.e., the fluid viscosity) should be minimized; a steep slope will result in a relatively high zero field damper force, and thereby decrease the ratio of the damper force at maximum flux density to damper force at zero field. Those skilled in the art will recognize that the chart of FIG. 1 is representative of the relationship between shear stress and shear rate of a typical MR fluid, with the slope of each line being equivalent to viscosity of the fluid. Thus, decreasing the viscosity of the fluid promotes a higher turn-up ratio.

Referring to FIG. 2A, a first embodiment of a magnetorheological energy absorbing (MREA) device 100 includes a damper assembly 102 that is bounded by an outer tube 104. An inner tube 106 is surrounded by the outer tube 104 such that an outer chamber 108 is partially defined between the two tubes 104, 106. The inner tube 106 defines an inner chamber 110. A piston 112 is movable within the inner tube 106 and includes a piston rod 114 and a piston head 116 secured to the rod 114. The piston head 116 is guided by and spans the inner chamber 110 and divides the inner chamber 110 into a first portion 118 that is on the opposite side of the piston head 116 from the rod 114 and a second portion 120 that is on the same side of the piston head 116 as the rod 114. The outer chamber 108 and the inner chamber 110 are filled with an MR fluid 123, the characteristics of which are described further below. A piston ring 121 helps to seal the piston head 116 to the walls of the inner tube 106, ensuring that flow of MR fluid 123 within the MREA, and especially within fluid cavities 133 described below, is not compromised by unintended flow paths.

First and second magnetic end structure assemblies 122, 124 are positioned adjacent to either end 126, 128 of the inner tube 106. The magnetic end structure assemblies 122, 124 are also referred to as magnetic flux returns and are preferably but not necessarily American Iron and Steel Institute standard (AISI) 12L14 low carbon steel with a nominal carbon content of 0.14% which has a high value of applied field for magnetic saturation. To improve its magnetic properties, the AISI 12L14 material may be annealed at 1600 degrees Fahrenheit for one hour and slowly cooled to room temperature before machining.

The magnetic end structure assemblies 122, 124 are formed with annular slots that receive and surround the ends 126, 128 of the inner tube 106, defining a consistently dimensioned gap or fluid cavity 133 between the tube 106 and each the magnetic structure assembly 122, 124. As best seen in FIG. 2B, the fluid cavities 133 each have an outer channel portion 134, an inner channel portion 136 that is parallel with the outer channel portion, and a looped portion 138 connecting the channel portions 134, 136. The fluid cavity 133 is referred to herein as a bi-fold valve. MR fluid 123 flows through the cavity 133, as further described below, such that the cavity 133 functions as a flow-mode bi-fold MR valve. A "flow-mode" MR valve is one in which the fluid flow is pressure driven and is not due to movement of a component in contact with the fluid, as in a shear mode. (The outer channel portion 134, inner channel portion 136 and looped portion 138 are numbered with respect to the magnetic end structure assembly 122; the magnetic end structure assembly 124 forms a like structure and cavity 133 in a mirror image of magnetic end structure assembly 122, as is apparent in FIG. 1.) The openings at the ends of the inner channel portion 136 and the outer channel portion 134 open to the inner chamber 110 and the outer chamber 108, respectively. Support rings 139A, 139B help maintain the relative positions of the end structure assemblies 122, 124 with respect to the inner tube 106 and outer tube 104. As best shown in FIG. 2B, the entire fluid cavity 133 (channel portions 134, 136 and looped portion 138) is defined by surfaces of the inner tube 106 and of the magnetic structure assembly 122 that are without discontinuity in slope or curvature at adjacent portions, without edges or abrupt changes in geometry, to promote laminar flow of fluid between the inner chamber 110 and the outer chamber 108 through the fluid cavity 133.

The fluid cavities 133 (channel portions 134, 136 and looped portion 138) present at either end of the inner chamber 110 fluidly connect the inner chamber 110 with the outer chamber 108, allowing magnetorheological fluid 123 to flow from the inner chamber 110 to the outer chamber 108 through the fluid cavity adjacent magnetic end structure assembly 124 and vice versa through the fluid cavity 133 adjacent magnetic end structure assembly 122, assuming the piston 112 moves from left to right in FIG. 2A within the inner tube 106 in response to an impact on movable impact member 141 connected to the piston 112.

The first and second magnetic end structure assemblies 122, 124 each have an opening in which an annular electrical coil 140A, 140B, respectively, is retained. The coils 140A, 140B are configured to generate a magnetic field, as indicated by the arrows generally circulating around each cross-sectional area of the coils 140A, 140B in FIG. 2A. Referring to FIG. 2B, which represents the fluid cavity 133 at the upper left in FIG. 2A, the field generated by coil 140A of FIG. 2A influences fluid flow along a length L of the channel portion 134 and along the same length L of channel portion 136 as the fluid flows in the direction of the arrows shown in FIG. 2B, from outer chamber 108 to inner chamber 106 due to the movement of the piston 112. When the coils 140A, 140B are energized, the magnetic field causes the MR fluid 123 within the channel portions 134, 136 along the length L to attain a higher yield stress, resulting in an increase in damper force in response to an impact force on a movable impact member 141 and resultant movement of the piston 112. Fluid flows through the channel portions 134, 136 substantially perpendicular to the magnetic field, allowing the field to cause the maximum amount of increased yield stress or apparent viscosity in the MR fluid 123. The magnitude of the field is controllable by controlling the input current to the coils 140A, 140B. Thus, varying the field allows the increase in yield stress of the MR fluid 123 to vary between the yield stress when no field is generated by the coils 140A, 140B and a maximum yield stress at flux saturation or when the maximum current is sent to the coils 140A, 140B). The fluid cavity 133 has no moving parts; thus, the yield stress of the MR fluid 123 simply resists the pressure driving the fluid through the fluid cavity 133.

In order to increase the effectiveness of the MREA device 100, the MR fluid 123 is specifically designed to have a low zero field viscosity (i.e., minimize slope of the lines in FIG. 1) and therefore achieve a low zero field damper force at a given piston velocity, thereby enabling a turn-up ratio desired for a more compact device 100 at the force and speed limitations of the various applications for which the device is intended (e.g., in one application, a zero field damper force not greater than 2 kilonewtons over a piston velocity range of 0 to about 7 meters per second). Specifically, referring to FIG. 2C, the MR fluid 123 includes magnetizable particles 150 with a silicate coating 152 thereon suspended in a carrier fluid 154. The coating 152 is a hydrophobic group that causes the viscosity and zero field yield stress of the MR fluid 123 to decrease. Comparative testing has shown that the coating 152 according to one embodiment inhibits oxidation of the iron particles in air at elevated temperature and makes the particle surface hydrophobic. Further, the yield stress at maximum applied field of an MR fluid made with coated particles is only slightly reduced and the viscosity and yield stress at zero field are greatly reduced as compared to a similar fluid made with uncoated particles. The properties of an MR fluid prepared with treated particles are shown in Table 1 below in comparison with a similar MR fluid prepared with untreated particles. Table 1 shows that the treatment has only a small effect on the on-state yield stress.

A coating of octyltriethoxysilane (OTES) provides an unexpected benefit in the form of greatly reduced off-state viscosity and yield stress. As shown in Table 1, the viscosity (in centipoise) of 40 and 45 volume percent iron MR fluids is reduced by about a factor of four and the off-state yield stress is reduced by more than a factor of 8-10 as compared to similar MR fluids prepared with untreated particles. This reduction in apparent viscosity will translate into reduced off-state drag when the MR fluid is used in a damper or torque transfer device.

TABLE 1

Off-state viscosity and yield stress for
40 and 45% MR fluids prepared with OTES-treated iron.

| Sample Code | Iron Volume Fraction | Treatment | Viscosity 40° C. [cp] | Yield Stress 40° C. [Pa] |
|---|---|---|---|---|
| 13MAG110 | 40% | Untreated | 543 | 415 |
| 14MAG062 | 40% | Treated | 128 | 37 |
| 14MAG074 | 45% | Untreated | 514 | indistinct |
| 14MAG077 | 45% | Treated | 136 | 57 |

The particles 150 with the coating 152 thereon may be present in about 10 to 60 percent by volume and the carrier fluid 154 may be present in about 40 to 90 percent by volume. The hydrophobic groups generally may be nonpolar, additional examples of which include linear aliphatic, branched aliphatic and linear or branched aromatic chains. For example, the protective coating may include hydrophobic groups including, but not limited to methyl, ethyl, pentyl, hexyl, heptyl and/or octyl or longer hydrocarbon chains. Preferably, but not necessarily, the coating 152 on the particle 150 may be present in about 0.01 to about 0.1 weight percent of the particle with the coating thereon. The carrier fluid 154 may include at least one of water, an alcohol, a glycol or polyol, silicone oil or hydrocarbon oil. Examples of suitable alcohols include, but are not limited to, heptanol, benzyl alcohol, ethylene glycol and/or polypropylene glycol. Examples of suitable hydrocarbon oils include, but are not limited to, polyalpha-olefins (PAO, mineral oils and/or polydimethylsiloxanes). Other suitable materials for the carrier fluid 154 are described hereafter. Suitable magnetizable particles are available from BASF Company under the trade name CM and HS, for example. A magnetic flux density ranging from about 0.01 tesla to about 2 tesla, for example, may be applied to the MR fluid 123 to increase the viscosity thereof.

Magnetic particles 150 suitable for use in the carrier fluids 154 are magnetizable, low coercivity (i.e., little or no residual magnetism when the magnetic field is removed), finely divided particles of iron, nickel, cobalt, iron-nickel alloys, iron-cobalt alloys, iron-silicon alloys and the like which may be spherical or nearly spherical in shape and have a diameter in the range of about 0.1 to 100 microns. Since the particles 150 may be employed in noncolloidal suspensions, it is preferred that the particles 150 be at the small end of the suitable range, preferably in the range of 1 to 10 microns in nominal diameter or particle size. The particles used in MR fluids are larger and compositionally different than the particles that are used in "ferrofluids" which are colloidal suspensions of, for example, very fine particles of iron oxide having diameters in the 10 to 100 nanometers range. Ferrofluids operate by a different mechanism from MR fluids. MR fluids are suspensions of solid particles which tend to be aligned or clustered in a magnetic field and drastically increase the effective viscosity or flowability of the fluid.

A suitable magnetizable solid for the magnetic particles 150 may include CM carbonyl iron powder and HS carbonyl iron powder, both manufactured, for example, by BASF Corporation. The carbonyl iron powders are gray, finely divided powders made of highly pure metallic iron. The carbonyl iron powders are produced by thermal decomposition of iron pentacarbonyl, a liquid which has been highly purified by distillation. The spherical particles include carbon, nitrogen and oxygen. These elements give the particles a core/shell structure with high mechanical hardness. CM carbonyl iron powder includes more than 99.5 wt % iron, less than 0.05 wt % carbon, about 0.2 wt % oxygen, and less than 0.01 wt % nitrogen, with a particle size distribution of less than 10% at 4.0 μm, less than 50% at 9.0 μm, and less than 90% at 22.0 μm, with true density>7.8 g/cm3. The HS carbonyl iron powder includes minimum 97.3 wt % iron, maximum 1.0 wt % carbon, maximum 0.5 wt % oxygen, maximum 1.0 wt % nitrogen, with a particle size distribution of less than 10% at 1.5 μm, less than 50% at 2.5 μm, and less than 90% at 3.5 μm. As indicated, the weight ratio of CM to HS carbonyl powder may range from 3:1 to 1:1 but preferably is about 1:1.

Examples of other iron alloys which may be used as the magnetic particles 150 include iron-cobalt and iron-nickel alloys. Iron-cobalt alloys may have an iron-cobalt ratio ranging from about 30:70 to about 95:5 and preferably from about 50:50 to about 85:15, while the iron-nickel alloys have an iron-nickel ratio ranging from about 90:10 to about 99:1 and preferably from about 94:6 to 97:3. The iron alloys maintain a small amount of other elements such as vanadium, chromium, etc., in order to improve ductility and mechanical properties of the alloys. These other elements are typically present in amounts less than about 3.0 percent total by weight.

The magnetic particles 150 may be in the form of metal powders. The particle size of magnetic particles 150 may be selected to exhibit bimodal characteristics when subjected to a magnetic field. Average particle diameter distribution size of the magnetic particles 150 is generally between about 1 and about 100 microns, with ranges between about 1 and about 50 microns being preferred.

The magnetic particles 150 may be present in bimodal distributions of large particles and small particles with large particles having an average particle size distribution between about 5 and about 30 microns. Small particles may have an average particle size distribution between about 1 and about 10 microns. In the bimodal distributions as disclosed herein, it is contemplated that the average particle size distribution for the large particles will typically exceed the average particle size distribution for the small particles in a given bimodal distribution. Thus, in situations where the average particle distribution size for large particles is 5 microns, for example, the average particle size distribution for small particles will be below that value.

The magnetic particles 150 may be spherical in shape. However, it is also contemplated that magnetic particles 150 may have irregular or nonspherical shapes as desired or required. Additionally, a particle distribution of nonspherical particles as disclosed herein may have some nearly spherical particles within its distribution. Where carbonyl iron powder is employed, it is contemplated that a significant portion of the magnetic particles 150 will have a spherical or near spherical shape.

The magnetic particles 150 with coating 152 can be integrated into a suitable carrier fluid 154. Suitable carrier fluids can suspend the MR particles but are essentially nonreactive. Such fluids include, but are not limited to, water, organic fluids or oil-based fluids. Examples of suitable organic and/or oil based carrier fluids include, but are not limited to, cycloparaffin oils, paraffin oils, natural fatty oils, mineral oils, polyphenol ethers, dibasic acid esters, neopentylpolyol esters, phosphate esters, polyesters, synthetic cyclo-paraffin oils and synthetic paraffin oils, unsaturated hydrocarbon oils, monobasic acid esters, glycol esters and ethers, silicate esters, silicone oils, silicone copolymers, synthetic hydrocarbon oils, perfluorinated polyethers and esters, halogenated hydrocarbons, and mixtures or blends thereof. Hydrocarbon oils, such as mineral oils, paraffin oils, cyclo-paraffin oils (also as napthenic oils), and synthetic hydrocarbon oils may be employed as carrier fluids. Synthetic hydrocarbon oils include those oils derived from the oligomerization of olefins such as polybutenes and oils derived from higher alpha olefins of from 8 to 20 carbon atoms by acid catalyzed dimerization, and by oligomerization using trialuminum alkyls as catalysts. Such poly alpha olefin oils can be employed as preferred carrier fluids. It is also contemplated that the oil may be a suitable material such as oils derived from vegetable materials. The oil of choice may be one amenable to recycling and reprocessing as desired or required.

The carrier fluid 154 of choice may have a viscosity between about 2 and about 1,000 centipoises at 25° C. with a viscosity between about 3 and about 200 centipoises being preferred and a viscosity between about 5 and about 100 centipoises being particularly preferred. It is contemplated that the carrier fluid 154 and magnetic particles 150 with coating 152 can be admixed to provide a composition having magnetic particles 150 with coating 152 in an amount between about 30 and about 60 percent by volume.

Another suitable carrier fluid 154 is a hydrogenated polyalphaolefin (PAO) base fluid, designated SHF21, manufactured, for example, by Mobil Chemical Company. The material is a homopolymer of 1-decene which is hydrogenated. It is a paraffin-type hydrocarbon and has a specific gravity of 0.82 at 15.6° C. It is a colorless, odorless liquid with a boiling point ranging from 375° C. to 505° C., and a pour point of −57° C.

Alternatively, the MR fluid 123 may include 10 to 14 wt % of a polyalphaolefin liquid, 86 to 90 wt % of treated magnetizable particles, optionally up to 0.5 wt % fumed silica, and optionally up to 5 wt % (of the liquid mass) of a liquid phase additive.

Fumed silica is a suspending agent added in about 0.05 to 0.5, preferably 0.5 to 0.1, and most preferably 0.05 to 0.06 weight percent of the MR fluid 123. The fumed silica is a high purity silica made from high temperature hydrolysis having a surface area in the range of 100 to 300 square meters per gram.

Referring again to FIG. 2A, the MREA device 100 includes a pneumatic chamber 156 operatively connected with the MR fluid 123 in fluid chamber 159 through a flexible diaphragm 158. The pneumatic chamber 156 is preferably filled with an inert gas, such as nitrogen or air, at 800 psi. The pneumatic chamber 156 functions as an accumulator mechanism to accommodate the change in volume of the rod 114 in the chamber 110 that results from piston 112 movement and to prevent cavitation of MR fluid 123 on the low pressure side (which is the second portion 120 of inner chamber 110 as the piston 112 moves to the right in FIG. 2A; first portion 118 of the inner chamber 110 as the piston 112 moves to the left in FIG. 2A). In contrast to a typical MREA device 100, the coils 140A, 140B were moved off the piston 112 to fixed locations adjacent either end of the inner tube 106. One of the advantages of such arrangement is that the size of the piston head 116 and the effective MR valve diameter (i.e., the effective diameter of the cavity 133, which is a function of the diameter d of the outer channel portion 134 and of the inner channel portion 136) can be more flexibly configured and not tied directly to or constrained by each other as they are when the coils are mounted to the piston 112. This approach enables a reduction of zero field damping force at high piston operating velocities by decreasing the effective piston-valve area ratio without decreasing the maximum field damping force. In this embodiment, the outer diameter (OD) of the MREA device 100 at its largest point preferably does not exceed 5 centimeters. Thus, damper force and tunability requirements are met while maintaining a compact overall size that is convenient for packaging in a variety of locations, such as on an automobile.

Yet another feature of the MREA device 100 that promotes the ability to achieve the desired tunability is the addition of a gasket 161 (which may also be referred to as a seal, packing, or packing flange) between the contacting surface of a hydraulic cap 162 and a U-cup holder or gland 164. A U-cup seal 160 is positioned between the gasket 161 and the rod 114. The hydraulic cap 162 is secured around the outer tube 104 and includes passages for connector wires 166 that carry electrical current to the coils 140A, 140B. An electrical connector (not shown) mounts to the hydraulic cap 162 in operative connection with the connector wires 166 similar to the electrical connector shown and described below with respect to FIGS. 3 and 4. The gasket 161 helps prevent leakage of carrier fluid 154 past the U-cup holder 164 from the inner chamber 110 along the interface of the rod 114 and the magnetic end assembly 122. Carrier fluid leakage increases the magnetizable particle concentrations which can result in excessively high zero field fluid viscosity and an off-state damping force higher than the desired or expected value. This, in turn, makes achieving a specific upturn ratio such as 2:1 more difficult with a compact MREA device. Carrier fluid leakage can ultimately lead to a clogged fluid path in the fluid cavity 133 of the MREA device 100 and may produce a semi-solid sedimentation at the bottom end (sedimentation pocket) of the MREA device 100. Note that the location of the "bottom end" varies depending on whether the MREA device 100 is installed for use horizontally, vertically, or otherwise.

Referring to the MREA device 100, assuming a maximum piston velocity of 6.71 meters per second, a zero field damper force of 2 kN, an MR fluid (i.e., MR fluid 123 with coated magnetic particles 150) with a zero-field fluid viscosity of 0.4 Pa-sec, a maximum field yield stress of 80 kPa at 0.7 tesla, and a fluid density of 3.863 kg per cubic meter, a fluid cavity 133 with smooth surfaces that are without discontinuity in slope or curvature at adjacent portions, and without edges, to promote laminar flow, an outer diameter OD of the MREA device 100 of 5 cm, and a length $L_t$ (here $L_t=4$ L, as there are four portions of the two separate cavities on either end of the inner chamber 110 that have an active length L (inner channel portion 136 and outer channel portion 134 for each cavity 133) of the flow reversing path being 64 mm and a gap d (i.e., the width of channels (inner portion 136, and outer portion 134) of the bi-fold cavity 133) being 1.2 mm (see FIG. 2B), a tunability of greater than 2 to 1 can be achieved according to known fluid mechanics formulae. Furthermore, the overall length of the MREA device performing according to these requirements is not more than 8 cm. The damper force F of a bi-fold MREA device can be obtained as follows:

$$F = A_p(\Delta P_\eta + \Delta P_\tau)$$

where $$\Delta P_\eta = f \frac{\rho L_t V_d^2}{2 D_h} \quad \text{and} \quad \Delta P_\tau = \frac{2 L_t \tau_y}{d}$$

Here $\Delta P_\eta$ is the Newtonian pressure drop, $\Delta P_\tau$ is the pressure drop due to the yield stress of an MR fluid, $\tau_y$ is the yield stress of an MR fluid, $\rho$ is the fluid density, d is the gap of the MR bi-fold valve-type cavity described above and $L_t$ is the total active length of the bi-fold valve-type cavities in the MREA device. $D_h$ is the hydraulic diameter which is used for non-circular valve path. For a bi-fold MREA device, for simplicity, the annulus gap of the bi-fold valve-type cavity is approximated by parallel plates. As a result, the hydraulic diameter $D_h$ is given by $D_h=2d$. The friction factor f may be calculated based on the Reynolds number for flow through the gap d, as is known. To promote laminar flow and a turn-up ratio of 2 in the preferred embodiment, the Reynold's number is kept below 850 for piston speeds ranging from 0 to 7 m/s. In the case of a bi-fold valve-type cavity, the Reynold's number is directly proportional to both the fluid velocity (and piston velocity) and the gap d, and is kept low by limiting either or both of these values. $V_d$ is the average fluid velocity in the gap d given by $$V_d = \frac{A_p V_p}{A_d} = \overline{A} V_p$$

Here $A_p$ is the effective piston area, $A_d$ is the cross-sectional area of the MR valve gap, and $V_p$ is the piston velocity. Assuming a cylindrical piston head, $$A_p = \pi r_p^2,$$

with $r_p$ being the radius of the piston head. For a cylindrical annulus, $$A_d = 2\pi(R_2-R_1)(R_1+R_2)/2,$$

with $R_2$ being the outer radius of the annulus and $R_1$ being the inner radius of the annulus. The bi-fold cavity 133 has two such annuli, one at the inner channel 136 and one at the outer channel 134. The ratio of $A_p/A_d$ is the fluid velocity amplification factor, $\overline{A}$, and determines the fluid velocity in the gap d for a given piston speed. If the amplification factor is large, the fluid velocity in the gap d can be large, even if the piston velocity is small.

Figure 3:
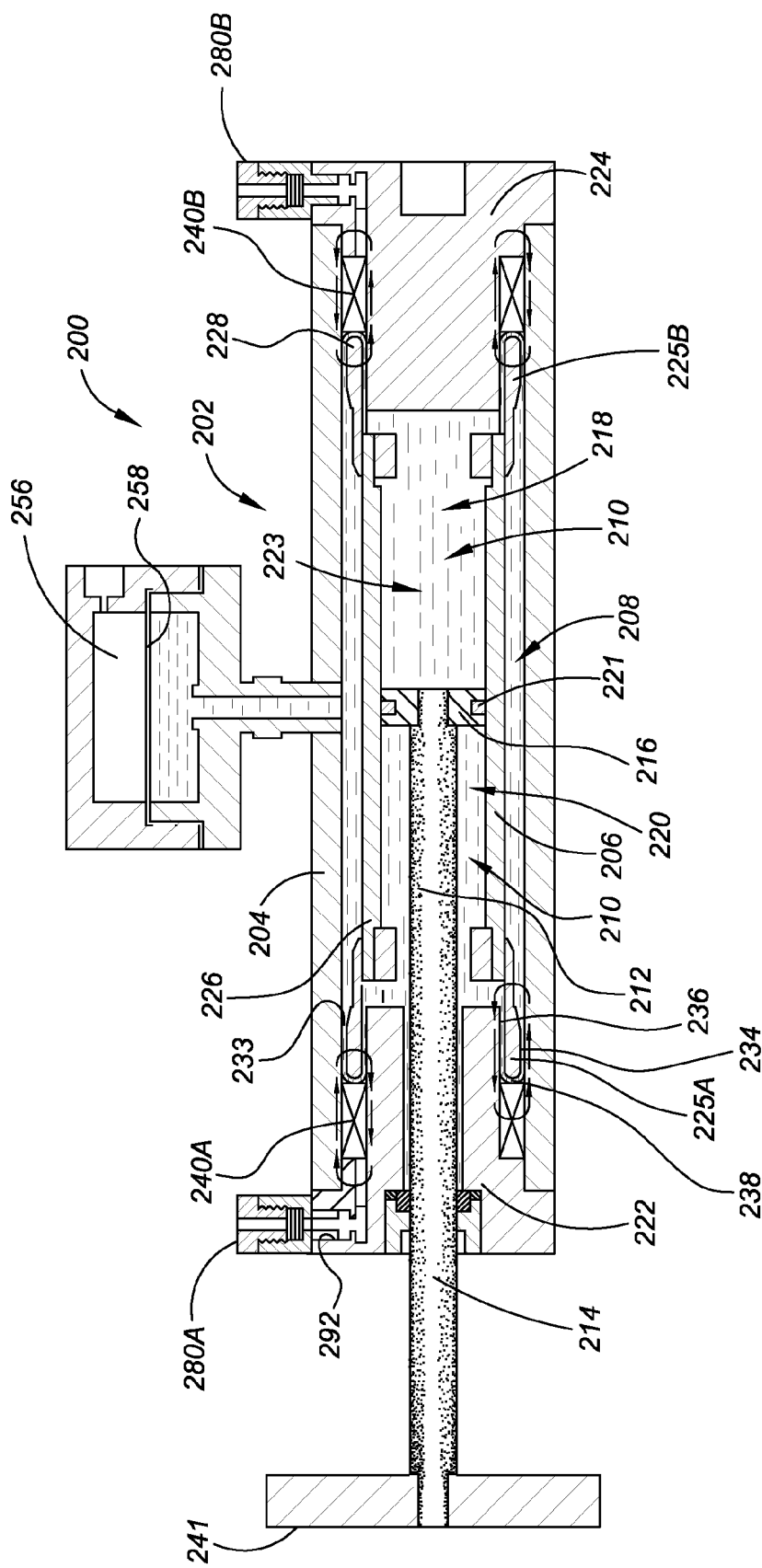
FIG. 3 is a schematic illustration in partial cross-sectional view of a second embodiment of a magnetorheological energy absorbing device within the scope of the invention.

Referring to FIG. 3, another embodiment of an MREA device 200 is illustrated. The MREA device 200 includes a damper assembly 202 that is bounded by an outer tube 204, with an inner tube 206 surrounded by the outer tube 204 such that an outer chamber 208 is partially defined between the two tubes 204, 206. The inner tube 206 defines an inner chamber 210. A piston 212 is movable within the tube 206 and includes a piston rod 214 and a piston head 216 secured to the rod 214. The piston head 216 is guided by and spans the inner chamber 210 and divides the inner chamber 210 into a first portion 218 that is on the opposite side of the piston head 216 from the rod 214, and a second portion 220 that is on the same side of the piston head 216 as the rod 214. The outer chamber 208 and the inner chamber 210 are filled with an MR fluid 223 having coated magnetic particles and that is generally identical to the fluid 123 of FIGS. 2A and 2C. A piston ring 221 helps to seal the piston head 216 to the walls of the inner tube 206, ensuring that flow of MR fluid 223 within the MREA device 200, and especially within the cavities 233, is not compromised by unintended flow paths.

First and second magnetic end structure assemblies 222, 224 are positioned adjacent an inner tube annular extension 225A, 225B connected at the respective ends 226, 228 of the inner tube 206. The magnetic end structure assemblies 222, 224 in cooperation with the outer tube 204 form annular slots that receive and surround the inner tube annular extensions 225A, 225B, defining a consistently dimensioned gap or fluid cavity 233 between the outer tube 204, and the respective magnetic end structure assemblies 222, 224 and the inner tube annular extensions 225A, 225B. The fluid cavity 233, also referred to herein as a bi-fold MR valve, establishes a flow-reversing path, and includes an outer channel portion 234, an inner channel portion 236 parallel with the outer channel portion 234, and a looped portion 238 connecting the channel portions 234, 236. (The outer channel portion 234, inner channel portion 236 and looped portion 238 are numbered with respect to the magnetic end structure assembly 222; the magnetic end structure assembly 224 forms a like structure and cavity in a mirror image of magnetic end structure assembly 222, as is apparent in FIG. 3.) The openings at the ends of the inner channel portion 236 and the outer channel portion 234 open to the inner chamber 210 and the outer chamber 208, respectively. The entire fluid cavity 233 (channel portions 234, 236 and looped portion 238) is defined by surfaces of the inner tube annular extension 225A and of the magnetic structure assembly 222 that are smooth, i.e., without discontinuity in slope or curvature at adjacent portions, to promote laminar flow of fluid between the inner chamber 210 and the outer chamber 208 through the fluid cavity 233.

The fluid cavities 233 (channel portions 234, 236 and looped portion 238) present at either end of the inner chamber 210 fluidly connect the inner chamber 210 with the outer chamber 208, allowing MR fluid 223 to flow between the inner chamber 210 and the outer chamber 208 through the fluid cavities 233 as the piston 212 moves within the inner tube 206 such as in response to an impact on the movable impact member 241.

The first and second magnetic end structure assemblies 222, 224 each have an opening in which an annular electrical coil 240A, 240B, respectively, is retained. The coils 240A, 240B are configured to generate a magnetic field, as indicated by the arrows generally circulating around each cross-sectional area of the coils 240A, 240B in FIG. 3, causing the MR fluid 223 within the channel portions 234, 236 to attain a higher apparent viscosity, thus increasing the damping force of the damper assembly 202.

The MREA device 200 includes a pneumatic chamber 256 operatively connected with the MR fluid 223 through a flexible diaphragm 258. The pneumatic chamber 256 functions as an accumulator mechanism to accommodate the change in the volume of the rod 214 within the chamber 210 that results from piston rod 214 movement and to prevent cavitation of MR fluid 223 on the low pressure side (second portion 220 of inner chamber 210 of the piston 212 as the piston moves to the right in FIG. 2A; first portion 218 of inner chamber 210 as the piston 212 moves to the left in FIG. 2A). The pneumatic chamber 256 is moved between the coils 240A, 240B, which is a more centrally-positioned location than that of the pneumatic chamber 156 in FIG. 2A and is suitable for applications requiring a minimal overall length of the MREA device 200.

Figure 4:
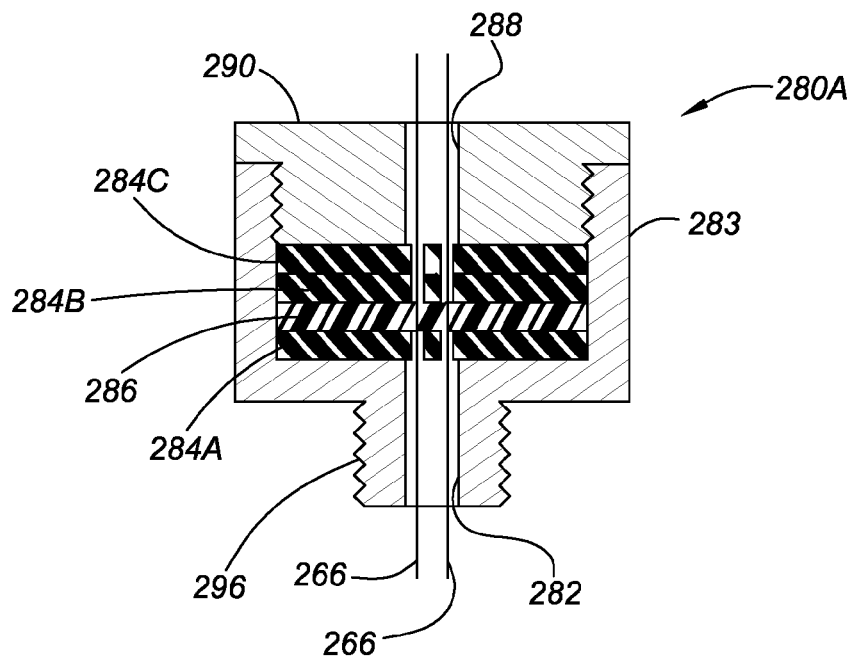
FIG. 4 is a schematic illustration in cross-sectional view of an electrical connector shown in FIG. 3.

The MREA device 200 includes electrical connectors 280A, 280B, shown best in FIG. 4, mounted to the magnetic end structure assemblies 222 and 224 and connected by wires 266 (shown in FIG. 4, not in FIG. 3) to the respective coils 240A, 240B. For better reliability of the MREA device 200 and ease in disassembly, the wires 266 go through central hole 282 of a socket 283 and are punched through a first layer of rubber disc 284A, then go through two small holes in a plastic disk layer 286, are punched through second and third layers of rubber discs 284B, 284C, and finally extend out through central hole 288 of plug 290. The plug 290 threads into the socket 283 by means of a thread (for example, a metric thread type) shown in FIG. 4 to tightly compress the rubber layers 284A-284C and the plastic layer 286 and produce enough stress at the contacting surface of the wires 266 and the rubber layers 284A-284C to seal the MR fluid 223 of FIG. 3 inside the MREA device 200 such that it does not leak past the coils 240A, 240B and through the openings in the magnetic end assemblies 222, 224 along the wires 266 to reach the connectors 280A, 280B. The socket 283 connects to a threaded wire outlet opening 292 in the magnetic end assembly 222 with the portion having the thread 296 shown in FIG. 4. The thread 296 is preferably NPT-type (American National Standard Taper Pipe Thread, a specification according to the American National Standards Institute) or NPTF-type (National Standard Dryseal Pipe Thread) to best seal the MR fluid 223.

Figure 5:
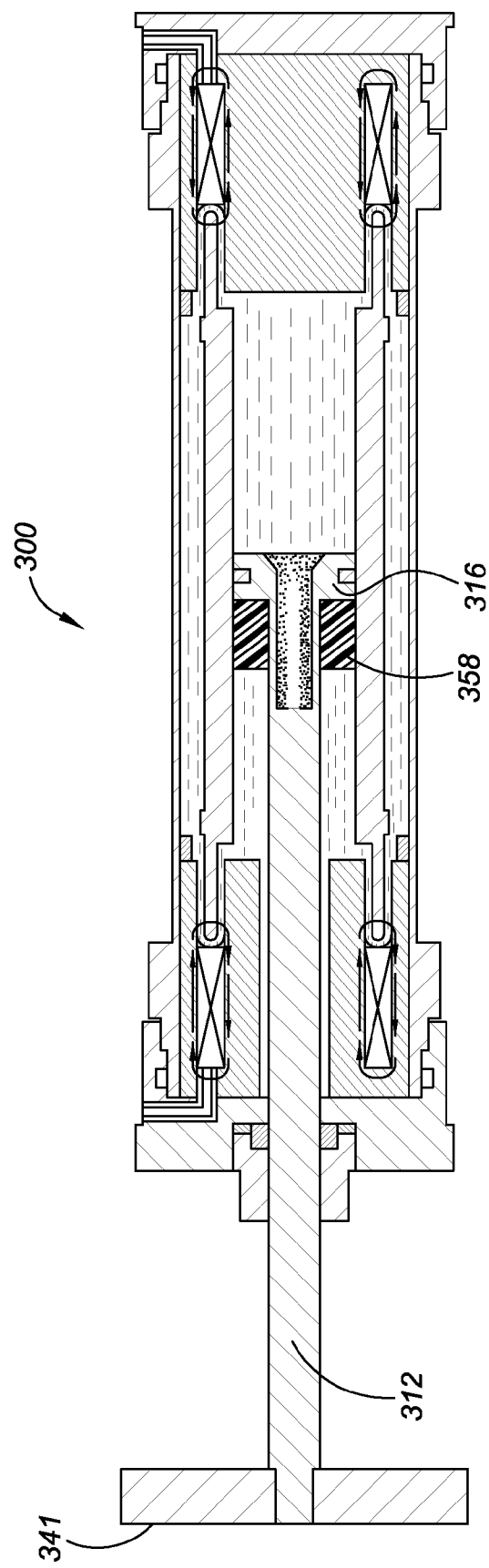
FIG. 5 is a schematic illustration in cross-sectional view of a third embodiment of a magnetorheological energy absorbing device within the scope of the invention.

Referring to FIG. 5, another embodiment of an MREA device 300 is illustrated that is largely identical to MREA device 100 of FIG. 2A with the exception of the replacement of the pneumatic chamber 156 and diaphragm 158 with a compressible member 358 fitted to the rod-side of a piston head 316. This new configuration can reduce the spring effect associated with a pneumatic chamber and, in comparison to MREA device 100 of FIG. 2A, eliminates the potential for sedimentation of the magnetic particles of the MR fluid in the channel connecting the inner chamber 110 with the fluid chamber 159 adjacent the diaphragm 158 in FIG. 2A. Also, the critical sealing requirements of high pressure gas of a pneumatic chamber are eliminated. The compressible member 358 compensates for the volume change due to movement of the piston rod 312 in the inner chamber at the backward side of the piston head 316 in response to impact on the impact member 341. The compressible member 358 may be a closed cell foam (e.g., rubber or sponge; or a closed cell ionomer foam with a compressibility around 50% and a compression stress around 50 psi) or a small gas chamber having, for example, air or nitrogen inside, or, still alternatively, bellows having a gas such as air or nitrogen inside. The overall length of the MREA device 300 is reduced by eliminating the pneumatic chamber, flexible diaphragm and fluid chamber adjacent the diaphragm, but this reduction may be at least partially offset by the need to increase the length to compensate for the decrease in maximum damper stroke created by the compressible member 358.

While the best modes for carrying out the invention have been described in detail, those familiar with the art to which this invention relates will recognize various alternative designs and embodiments for practicing the invention within the scope of the appended claims.

The invention claimed is:

1. An energy absorbing device comprising:
   a damper assembly having inner and outer concentric tubes and a piston movable within the inner tube; wherein the damper assembly is configured to form bi-fold valve-type cavities to operatively connect an inner chamber of the inner tube with an outer chamber formed between the inner and outer tubes;
   a magnetorheological fluid filling the chambers and the bi-fold valve-type cavities;
   electrical coils adjacent to the bi-fold valve-type cavities; wherein the damper assembly, the magnetorheological fluid, and the electrical coils are configured so that the electrical coils are selectively energizable such that the energy absorbing device provides a full range of desired tunability of damper force over a relevant range of piston velocities in automotive applications;
   electrical wires extending from the electrical coils;
   an electrical connector having:
      a socket defining a cavity;
      rubber layers surrounding a plastic layer within the socket; and
      a plug enclosing the rubber and plastic layers within the socket; wherein the socket, the plug, and the plastic layer define aligned holes through which the electrical wires extend; and wherein the electrical wires extend through the rubber layers.

2. The energy absorbing device of claim 1, wherein the magnetic fluid includes magnetic particles that are coated to enhance laminar flow of the magnetorheological fluid.

3. The energy absorbing device of claim 1, wherein the magnetorheological fluid contains about 10 to 60 percent by volume magnetic particles.

4. The energy absorbing device of claim 1, wherein a ratio of damper force at maximum applied field to damper force at zero applied field is approximately two.

5. The energy absorbing device of claim 1, wherein the piston includes a rod and a piston head operatively connected to the rod; wherein the piston head is configured to substantially span the inner chamber; and further comprising:
   a compressible member within the inner chamber surrounding the piston rod adjacent the piston head and extending from the piston head along the piston rod; and wherein the compressible member is configured to vary in volume as the piston moves within the inner chamber.

6. The energy absorbing device of claim 1, wherein the cavities are characterized by continuous surfaces without discontinuity in curvature to enhance laminar flow of the magnetorheological fluid through the cavities as the piston moves.

7. An energy absorbing device comprising:
   a damper assembly with:
      an inner tube having opposing ends and defining an inner chamber therein;
      an outer tube generally surrounding the inner tube to partially define an outer chamber between the inner tube and the outer tube;
      a piston movable within the inner tube and dividing the inner chamber; and
      first and second magnetic end structure assemblies positioned at the respective ends of the inner tube to further define the inner and outer chambers; wherein the first and second magnetic end structure assemblies each at least partially define a cavity with openings at both the inner and the outer chamber and a looped portion therebetween establishing a flow-reversing path between the cavity openings;
   a magnetorheological fluid within the inner and outer chambers and the cavities that contain about 20 to 60 percent by volume coated magnetic particles;
   first and second electrical coils fixed adjacent the first and second magnetic end structure assemblies, respectively, and energizable to vary damping force of the energy absorbing device by varying the yield stress of the magnetorheological fluid
   wherein the piston includes a rod and a piston head operatively connected to the rod; wherein the piston head is configured to substantially span the inner chamber; and wherein the damper assembly further includes:
      a hydraulic cap adjacent one of the coils, concentric with the piston rod, and defining a rod opening through which the piston rod moves;
      a gland adjacent the hydraulic cap, opposite said one of the coils concentric with the piston rod, and defining another rod opening through which the piston rod moves; and
      a gasket concentric with the piston rod and positioned between the hydraulic cap and the gland to seal the rod openings.

8. The energy absorbing device of claim 7, wherein the magnetic particles have a silicate coating thereon comprising a hydrophobic group.

9. The energy absorbing device of claim 7, wherein the cavities are characterized by continuous, smooth surfaces to enhance laminar flow of the magnetorheological fluid through the cavities as the piston moves.

10. The energy absorbing device of claim 7, further comprising:
    electrical wires extending from the electrical coils;
    an electrical connector having:
       a socket defining a cavity;
       rubber layers surrounding a plastic layer within the socket; and a plug enclosing the rubber and plastic layers within the socket; and wherein the socket, the plug, and the plastic layer define aligned holes through which the electrical wires extend; and wherein the electrical wires extend through the rubber layers.

11. The energy absorbing device of claim 7, wherein the piston includes a rod and a piston head operatively connected to the rod; wherein the piston head is configured to substantially span the inner chamber; and further comprising:

a compressible member within the inner chamber surrounding the piston rod adjacent the piston head and extending from the piston head along the piston rod; wherein the compressible member is configured to vary in volume as the piston moves within the inner chamber.

12. The energy absorbing device of claim 7, further comprising:

a pneumatic chamber in fluid communication with the outer chamber and positioned between the magnetic end structure assemblies; and wherein the pneumatic chamber is configured to vary in volume as the piston moves within the inner chamber.

* * * * *